June 25, 1935.  A. F. KLAPPAUF  2,006,172
ELECTRIC MACHINE
Filed April 4, 1932  2 Sheets-Sheet 1
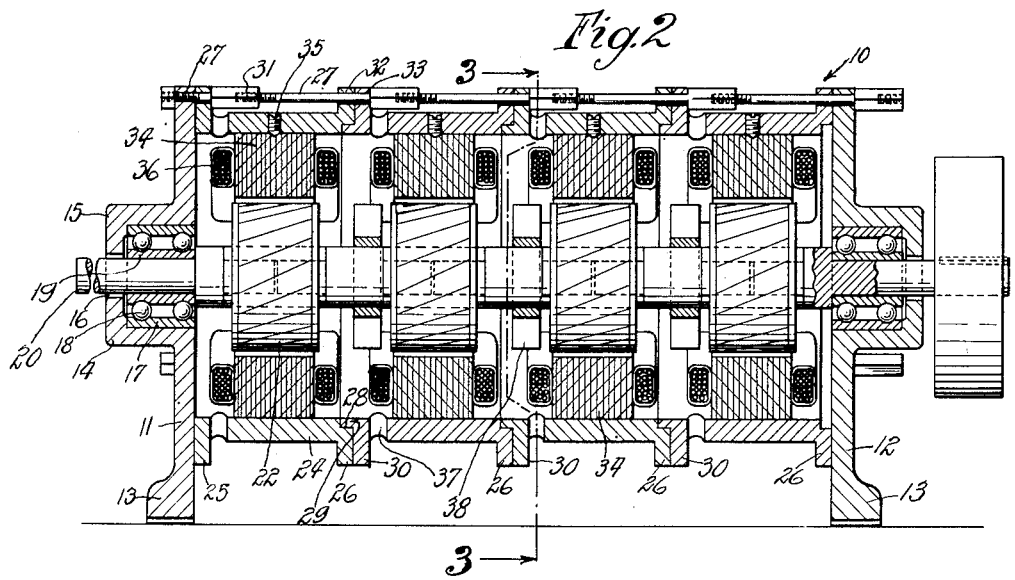
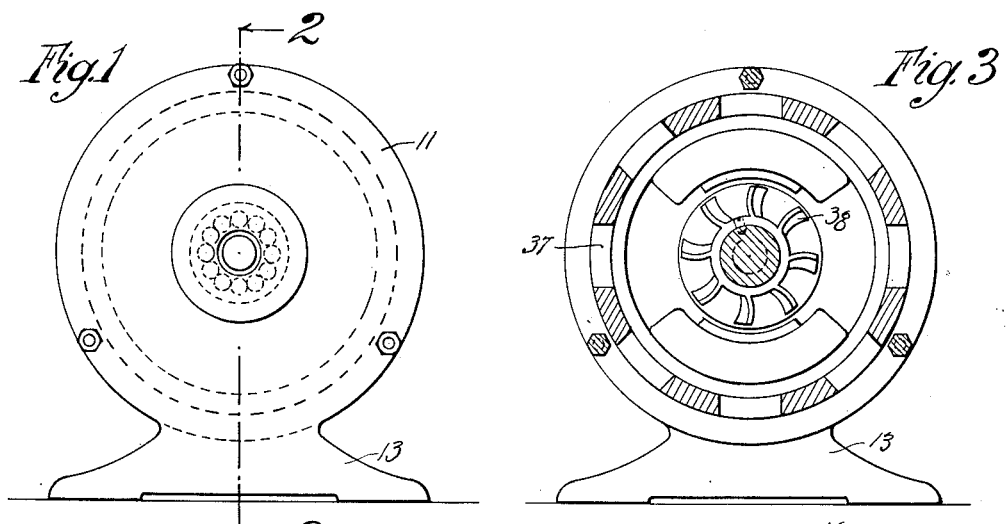
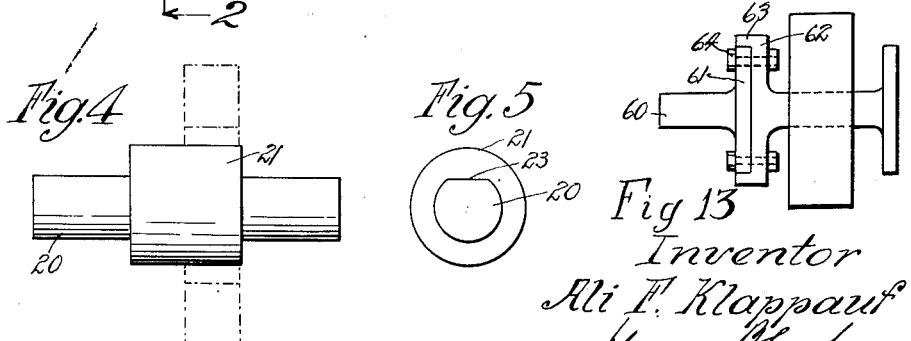
Inventor
Ali F. Klappauf
by Henry Hech
Attorney.

June 25, 1935.  A. F. KLAPPAUF  2,006,172
ELECTRIC MACHINE
Filed April 4, 1932   2 Sheets-Sheet 2
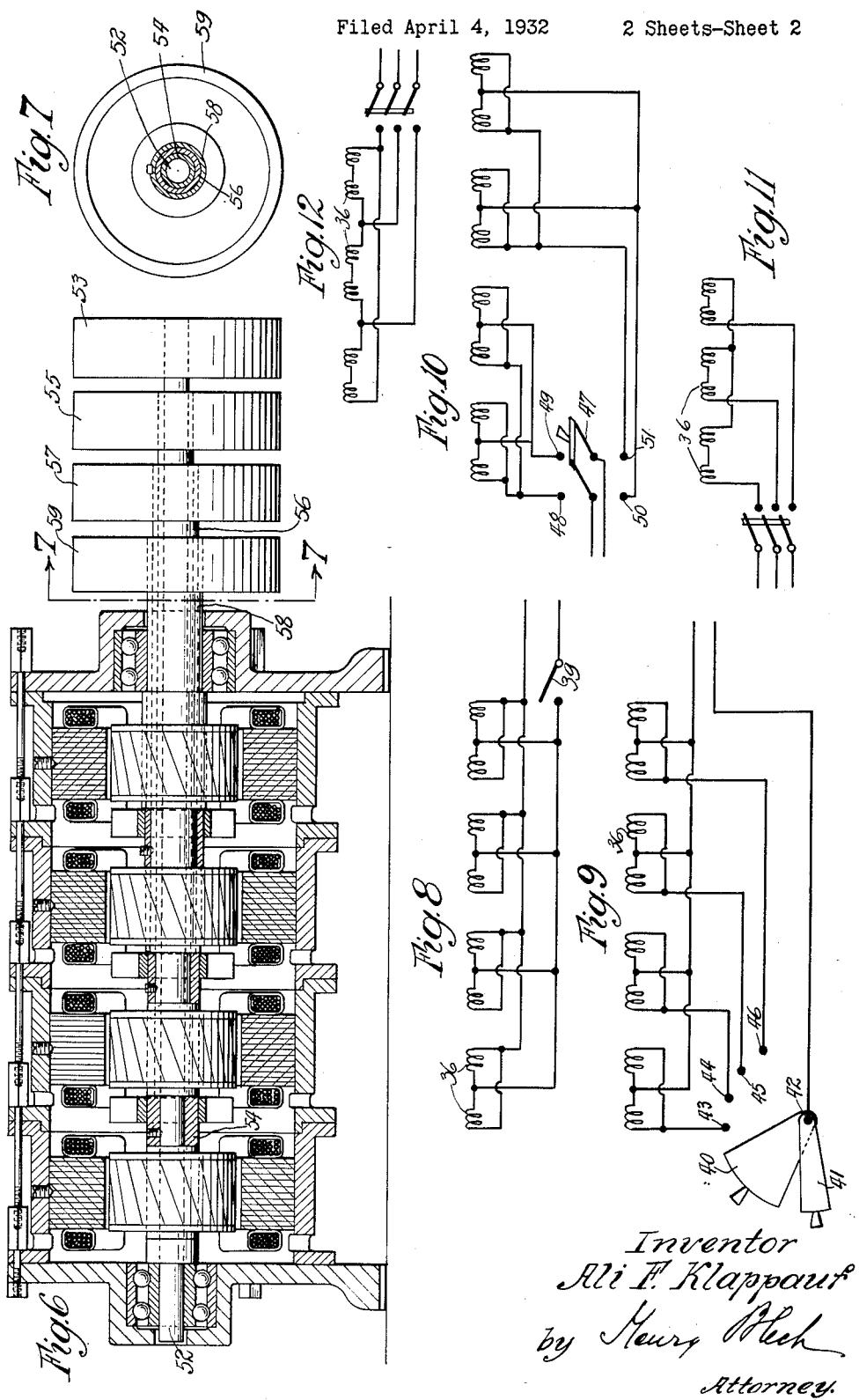
Inventor
Ali F. Klappauf
by Henry Blech
Attorney.

Patented June 25, 1935

2,006,172

UNITED STATES PATENT OFFICE 2,006,172

ELECTRIC MACHINE

Ali F. Klappauf, Chicago, Ill.

Application April 4, 1932, Serial No. 603,132

4 Claims. (Cl. 172—120)

The invention relates to electric machines of the type where dynamic-electric current is relied upon to energize either the field coil or a rotor in order to produce electrical or mechanical power.

It is an object of the invention to provide a machine of the character specified wherein a combination or multiple of fields or rotors are assembled in such relation to provide flexibility, selectivity of power, selectivity of speeds, direction of rotation, voltages and phases.

It is a further object of the invention to provide a machine of the character specified, wherein a plurality of units each comprising a field and a rotor are assembled in compact relation to constitute a single machine and yet afford a great latitude of selectivity of power, speed, direction of rotation, voltages and the like.

It is a further object of the invention to provide a machine which comprises a plurality of units which may be conveniently and rapidly mounted for operation and is economical in operation.

It is a further object of the invention to provide a machine of the character specified composed of independent units, permitting operation of some of the units even though others become disabled by short circuits, grounding, or other disturbances or defaults.

A still further object of the invention constitutes a provision of an electric machine in which the horse power can be increased or decreased without the employment of electrical resistances in a rapid and convenient manner, either automatically or manually.

It is also an object of the invention to provide a machine of the character specified in which some of the units may rotate in one direction while others rotate in the opposite direction at the same time.

A still further object aims at providing an electric machine wherein a minimum starting current is necessary to place the entire machine in operation.

Another object of the invention aims at providing an electric machine composed of a plurality of units, each comprising a rotor and a stator, wherein the rotor and the stator can be made in standard unit type sizes, so that the manufacture of the units is simplified and delays in the replacement of the units are avoided.

It is also an object of the invention to provide an electric machine of the character specified which may be used uninterruptedly even though one of the units becomes disabled by simply maintaining the machine in operation with the remaining units.

It is also an object of the invention to provide certain details of construction and arrangement tending to enhance the utility and efficiency of the machine of this character.

With these and other equally important objects in view which will become apparent from a perusal of the invention, the latter comprises the means described in the following specification, particularly pointed out in the claims forming a part thereof, and illustrated in the accompanying drawings, in which Fig. 1 is an end view of an electric machine constructed in accordance with my invention.

Fig. 2 is a section on the line 2—2 of Fig. 1.

Fig. 3 is a cross sectional view, the section being taken on the line 3—3 of Fig. 2.

Fig. 4 is a detailed view of a shaft provided with a spacing member which serves as a support for a fan.

Fig. 5 is an end view of the parts shown in Fig. 4.

Fig. 6 is a section similar to Fig. 2 of a modification.

Fig. 7 is a section on the line 7—7 of Fig. 6.

Figs. 8 to 12, inclusive, show diagrams of connections of the various units in a circuit.

Fig. 13 is a detail view of a modified form of shaft and associated parts for connecting another shaft.

Referring to the several views in the drawings, 10 generally indicates an electric machine which is composed of a plurality of units each comprising a rotor and a stator, said units being assembled so that the machine operates as a single machine.

The electric machine comprises end plates 11 and 12 which are formed circularly, as shown in Fig. 1, and formed integral with a base portion 13 to support the machine.

It is, of course, within the scope of the invention to provide end plates of any other configuration, and the particular type of circular construction is merely shown by way of example and not by way of limitation.

The end plates 11 and 12 are provided with an integral hub 14 of hollow construction, which hub is open at the inner end and closed at the outer end by a wall 15 having a central aperture 16 for a purpose presently to be explained.

The hub 14 has a bearing sleeve 17 and spaced therefrom by rollers 18, another bearing sleeve 19 is provided surrounding a shaft 20 whose free end protrudes through the hub opening 16 from the hub.

The shaft 20 is provided with a spacing member 21 secured to the shaft intermediate its ends, as shown in Fig. 4.

The shaft 20, in abutment with its spacing member 21, carries a rotor 22 which may be of any suitable or approved construction, and which is adapted to execute a rotary motion under the influence of the magnetic flux produced by the magnetic fields of the machine when used as a motor, as will be readily understood by those versed in the art.

Attention is called to the fact that the end of the shaft 20 beyond the spacing member 21 extends to a point short of the center of the rotor and the other half of the rotor is supported by the adjacent end of the succeeding shaft 20 of the second unit, as will be hereinafter further explained.

Attention is called to the fact that the diameter of the shaft is selected with a view of accommodating the maximum power available from the machine, and is preferably shaped to permit the securing of the rotor on the shaft to prevent relative rotation between these parts.

As shown in Fig. 5, the shaft 20 is formed with a flat face 23 so as to provide a key fit between the shaft and the rotor.

The end plates 11 and 12 are maintained in spaced relation by one or a plurality of drum sections 24, as shown in Fig. 2, which are provided with circular end flanges 25 and 26.

The flange 25 is secured to the end wall 11 by a plurality of bolts 27. The end flange 26 is recessed as at 28 to provide a seat for a projection 29 of the end flange 30 of the adjacent section. Thus the end flanges 26 and 30 interfit to provide a continuous shield or housing for the machine.

The end flange 26 of the last unit shown in Fig. 2 is secured to the end wall 12.

If the machine is to be constructed only as a single unit machine, then the end plate 12 is maintained adjacent to the flange 26 of the first unit shown at the left in Fig. 2 and is secured thereto by bolts or any other approved or convenient manner.

The bolts 27 are provided with a hexagonal head 31, which is provided with a tapped bore to receive in threaded relation the adjacent end of the succeeding bolt 27.

The adjacent flanges 26 and 30 are provided with coinciding apertures 32 and 33 to provide for the passage of the bolts 27.

In central relation to the drum sections 24 is secured a detachable field core 34 held in place by a set screw 35, and field coils 36 are wound around the core capable of emitting a magnetic flux or establishing a magnetic field traversing the rotor, so as to set up inductions in the rotor to produce electrical or mechanical power thereof.

The field coils are, of course, dimensioned to meet the various requirements of speed, power, voltages, and phases.

Attention is called to the fact that each drum section is provided with a plurality of openings 37 to provide for ingress and egress of air.

On the spacer member 21, a plurality of fan blades 38 are secured, so that upon rotation of the rotor, air currents are set up for the cooling of the machine.

The rotor 22 may be constructed of the squirrel cage type or of the collector ring type.

The machine may be employed with separate speeds for each individual unit depending upon the field winding of the respective units, and said units may be used singly or collectively.

In Figs. 8 to 12, inclusive, typical diagrams are shown in the manner in which the machine is connected for various purposes. The diagrams are merely illustrated by way of giving a few examples but not for the purpose of disclosing all the possible arrangements and changes that can be made to explain the great latitude of selectivity and flexibility possible with this machine.

Thus in Fig. 8, the field coils 36 are connected in single phase to a circuit, and this circuit is controlled by a switch 39, which operates a multiple of units of power at 110 volts.

In Fig. 9 a circuit is mentioned in which selectivity is provided as to the number of units that may be cut in or out in the operating circuit. As shown in Fig. 9, a switch 40 is provided which is constructed as a sector, and in superposed relation a smaller switch 41 is provided, both being rotatable about a common pin 42.

The switches co-operate with a series of contact points 43, 44, 45 and 46, each contact point being connected to each unit. It is, of course, within the scope of the invention to provide more or less than four units, but four units have been shown merely by way of a particular illustration.

If the switch 40 covers contact point 43 and 44, and in addition thereto the last unit connected to contact point 46 is wanted, but the unit connected with contact point 45 is to be omitted, then in that case the switch 40 is turned to cover contact points 43 and 44 and in addition switch 41 is turned to cover contact point 46, so that in that case the first, second, and last unit is cut into the circuit while the third unit is eliminated. It is obvious that any number of variations can be provided by means of the employment of switches 40 and 41. Thus the first unit and the last two units may be cut in the circuit, or three consecutive units may be employed in accordance with the particular requirements of the operator. The provision of the two switches also enables easy detection of whether or not one of the units may be inoperative by reason of burning out or any other defect. If the switch 41 is placed in contact with the various contact points 43 to 46 successively, the respective units are connected for rotation of the unit and indicates that the units are in order. Whereas, non-rotation quickly establishes that one of the units is out of commission.

In Fig. 10, a diagram is shown in which two units may be employed simultaneously, or the other two units may be employed to provide forward or reverse rotation, or as emergency units.

If the switch 47, shown in Fig. 10, is placed in contact with points 48 and 49, then the first two units, shown in the diagram, rotate in one direction. If, however, the switch 47 is placed in contact with points 50 and 51, then the remaining two units will rotate in the opposite direction because of the difference of the connections in the two circuits. Of course, instead of providing the arrangement of forward and reverse rotation for the two units, the same applies to three units in one direction and a single unit in the opposite direction, or any further combination where more than four units are being employed.

Fig. 11 shows the operation of the machine for star connection, while in Fig. 12 the units are connected in delta formation.

Attention is called to the fact that in employing the machine on a three phase system, either star or delta, that even though one or more of the units may rotate in one direction, while the remaining units may rotate in the opposite direction at the same time.

In order to eliminate the surge of starting a four unit type machine, one unit may be used at the start to bring the speed to synchronism, and the other three units can then be cut in so that in this way of starting the machine, the starting current is kept at a minimum.

Attention is called to the fact that by providing four units, selectivity of the horse power is possible by cutting in one or all of the units, either automatically or otherwise.

Attention is called to the fact that the electric machine not only can be employed as a motor, but also as a generator.

The modification shown in Fig. 6 differs from the modification shown in Fig. 2 by the fact that instead of employing sectional shafts, telescoping shafts are employed which are extended to have secured thereto pulleys from which power may be taken off.

Thus, the shaft 52 extends throughout the machine and there-beyond to carry at its free end a pulley 53.

The tubular shaft 54 surrounds the solid shaft 52 and carries at its free end a pulley 55.

A hollow shaft 56 surrounds the shaft 54 and carries at its outer free end a pulley 57.

Likewise a hollow shaft 58 carries at its free end a pulley 59.

As far as the operation, selectivity and rearrangement are concerned with reference to the first modification they apply with equal force to the second modification.

The pulleys, 53, 55, 57 and 59, of course, will rotate in either direction depending on the connection of the respective unit. A greater selectivity can be obtained in rotation, speed and power at the same time for the various units by properly connecting the units in the circuit, as has been mentioned in connection with the first modification.

In Fig. 13 a different mode of connecting the adjacent rotor shafts together is shown. The shaft 60 of the rotor is provided at one end with a male flange 61, while the other end of the shaft is provided with a female flange 62 which is formed with a rim 63 of sufficient depth and diameter to permit the male flange of the adjacent shaft to be received therein and secured to the female flange by a plurality of screws 64. This method of connecting the shafts together is advantageous in holding the rotor in central relation with respect to the field.

While the drawings disclose a preferred embodiment of the invention, the same are merely illustrated by way of explanation and not by way of limitation. Numerous changes, alterations, and revisions may be made within the purview of the invention.

I, therefore, do not wish to limit the invention to the details of construction or arrangement of parts, as shown, but claim my invention as broadly as the state of the art permits.

I claim:

1. An induction motor including a sectional casing, a sectional shaft, a motor unit including a field coil carried by each section of the casing and a rotor for each field coil, each rotor serving to couple the meeting ends of the shaft sections against rotary movement with respect to each other and to the rotor, and means for connecting the sections of the casing together.

2. An induction motor including a sectional casing, a sectional shaft, a motor unit for each casing section including a field coil carried by that section and a rotor, each rotor fitting the meeting ends of adjacent shaft sections and coupling said sections against independent rotary movement without interfering with independent axial movement, and means for connecting the casing sections.

3. An induction motor, including a sectional casing carrying a field coil, a sectional shaft made up of sections having flattened peripheral portions adjacent their meeting ends, a rotor for each field coil and arranged to embrace the meeting ends of the shaft sections, the rotor being formed to interlock with the flattened ends of the shaft sections to form a rotary couple, and means for securing the sections of the casing together.

4. An induction motor including a sectional casing, a field coil carried by each section, a sectional shaft made up of sections having their meeting ends mutilated, a spacing element on each shaft section, a rotor for each coil formed to cooperate with the meeting ends of adjacent shaft sections and interlocking with the mutilated portions of such shafts to provide a rotary couple for adjacent shaft sections, the spacing element on each shaft section maintaining the rotors in coupling relation to the shaft sections, and connecting means for the shaft sections to prevent endwise movement for the sections.

ALI F. KLAPPAUF.